US005220676A

United States Patent [19]

LoGalbo et al.

[11] Patent Number: 5,220,676

[45] Date of Patent: Jun. 15, 1993

[54] SYNCHRONIZATION METHOD AND APPARATUS

[75] Inventors: Robert D. LoGalbo, Addison; Mark C. Cudak, Mount Prospect; Bradley M. Hiben, Glen Ellyn, all of Ill.

[73] Assignee: Motorola, Inc., Schaumburg, Ill.

[21] Appl. No.: 687,815

[22] Filed: Apr. 19, 1991

[51] Int. Cl.[5] ........................ H04B 7/005; H04B 1/00

[52] U.S. Cl. .................................. 455/51.2; 455/13.2; 455/56.1

[58] Field of Search .................... 455/12.1, 13.2, 51.1, 455/51.2, 53.1, 56.1, 67.6; 370/104.1, 105.1, 100.1, 105.4, 105.5, 106; 375/106, 107, 111, 112, 113, 114

[56] References Cited

U.S. PATENT DOCUMENTS

| | | | |
|---|---|---|---|
| 4,696,052 | 9/1987 | Breeden | 455/56.1 |
| 4,792,963 | 12/1988 | Campanella et al. | 455/13.2 |
| 4,984,238 | 1/1991 | Watanabe et al. | 370/105.1 |
| 5,113,395 | 5/1992 | Murakami et al. | 370/105.1 |
| 5,128,925 | 7/1992 | Dornstettere et al. | 455/51.1 |

*Primary Examiner*—Reinhard J. Eisenzopf
*Assistant Examiner*—Lisa Charouel
*Attorney, Agent, or Firm*—Wayne J. Egan

[57] ABSTRACT

An improved synchronization method and apparatus, according to the invention, is provided. According to the invention, in a simulcast system having a remote site receiving frames from a base site, each frame containing a predetermined number (k) of transmit sample periods, and the transmit sample clock and remote synchronization clock frequencies known ($f_{tx}$ and $f_{pps}$ respectively), the remote site synchronizes a frame as follows. First, it receives a frame from the base site. Second, it determines the sequence number n for the frame. Third, it determines the launch time the first frame was to be broadcast from the remote site. Fourth, it computes a realignment time based on [(n−1)*(k)+launch time for first frame] MOD ($f_{tx}f_{pps}$). Fifth, it transmits the first bit of the frame at the realignment time.

28 Claims, 6 Drawing Sheets

SYNCHRONIZATION METHOD AND APPARATUS

TECHNICAL FIELD

This application relates to a method and apparatus for dynamic resynchronization of remote sites in an absolute time simulcast system.

BACKGROUND OF THE INVENTION

In an absolute time simulcast broadcast, if a remote base station were to lose synchronization (e.g., brown out) with the other base stations, the base station could restart broadcasting only if its baseband signal is in sync with the other base stations' baseband signals. If the remote could not resync upon restarting, the remote would have to stay dekeyed for the duration of the simulcast broadcast for fear of destructively interfering with the other transmissions that were synchronized.

Referring now to FIG. 1, there is shown a first time diagram comparing the carrier signals of several remotes. There is shown the carrier signal $A_1$ of a first remote, the carrier signal $A_2$ of a second remote, and the carrier signal $A_3$ of a third remote. In the first time interval 141 the three carrier signals are aligned in time over the optimal coverage point. In the second time interval 143, the carrier signal $A_1$ of the first remote, fails, that is, suffers a brown out. In the third time interval 145, and subsequent to the brown out suffered by the carrier signal $A_1$ of the first remote, it is assumed that the first carrier awakens, begins transmitting without synchronization or phase alignment, and destructively interferes with the second remote signal $A_2$, and the third remote signal $A_3$, because it is out of phase. Refer to the corresponding sinusoidal waveforms 115, 125 and 135. One method of achieving phase alignment, of course, is for each remote site to begin propagation of its signal based on a predetermined launch time.

If it were to broadcast without being synchronized, it would degrade the simulcast broadcast.

Another possibility, of course, would be for the remote site to cease broadcasting in the event it loses the needed phase control. This is shown in FIG. 2. Referring now to FIG. 1, there is shown a second time diagram comparing the carrier signals of several remotes. There is again shown the carrier signal $A_1$ of a first remote, the carrier signal $A_2$ of a second remote, and the carrier signal $A_3$ of a third remote. In the first time interval 241 the three carrier signals are aligned in time over the optimal coverage point. In the second time interval 243, the carrier signal $A_1$ of the first remote fails, that is, suffers a brown out. In the third time interval 245, and subsequent to the brown out suffered by the carrier signal $A_1$ of the first remote, it is assumed that the first carrier awakens, but ceases transmitting because it is unable to recover necessary synchronization or phase alignment. Although no destructive interference results, the coverage area is compromised because of one less simulcast signal. The cost of losing a base station during a simulcast broadcast is related to the loss of coverage area.

What is needed, of course, is a method and apparatus for synchronization that will achieve signal timing shown in FIG. 3. In this figure, as in the previous FIGS. 1-2, it is assumed the carrier signal $A_1$ of the first remote fails during time interval 343. In this case, however, during the subsequent time interval 345, as depicted in FIG. 3, after the brown out, the first remote awakens, receives the realignment information, and re-enters simulcast transmission in phase with the other remotes. As a result, the corresponding sinusoidal signals 315, 325, and 335 are correctly aligned with respect to time and phase.

Therefore, there is a need for an improved synchronization method and apparatus.

SUMMARY OF THE INVENTION

Accordingly, an improved synchronization method and apparatus, according to the invention, is provided. This method and apparatus of resynchronization will guarantee maximum coverage area during a simulcast transmission regardless of when a base station enters the simulcast broadcast. Briefly, according to the invention, in a simulcast system having a remote site receiving frames from a base site, each frame containing a predetermined number (k) of transmit sample periods, and the transmit sample clock and remote synchronization clock frequencies are known ($f_{tx}$ and $f_{pps}$, respectively), the remote site synchronizes a frame by calculating a realignment time as follows. First, it receives a frame from the base site. Second, it determines the sequence number n for the frame. Third, it determines the time the first frame was to be broadcase from the remote site, known as the launch time. Fourth, it computes a realignment time base on [(n−1)*(k)+launch time for first frame] MOD ($f_{tx}f_{pps}$). Fifth, it transmits the first bit of the frame at the realignment time.

DETAILED DESCRIPTION OF THE INVENTION

Figure 1:
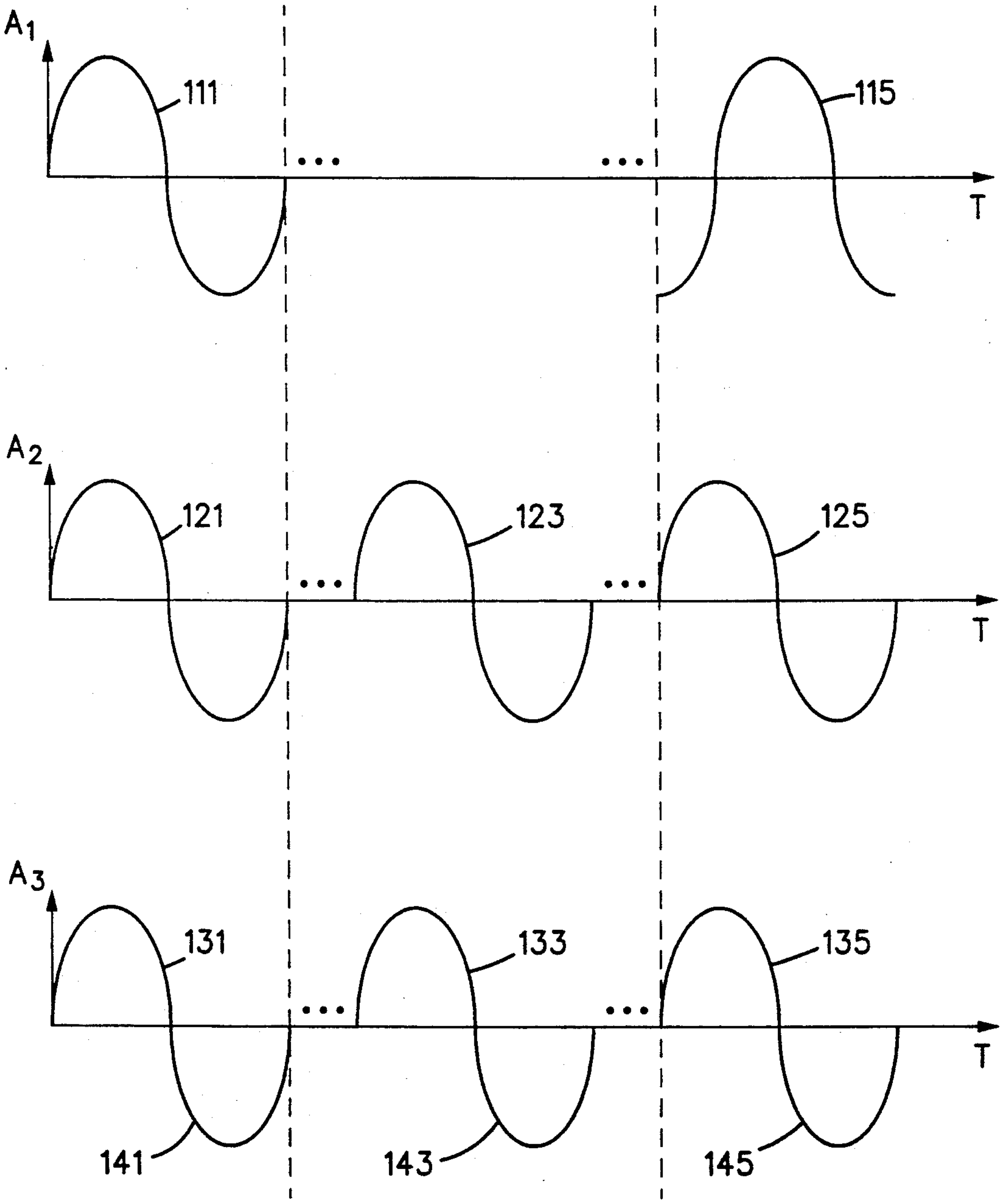
FIGS. 1-3 are timing diagrams.
Figure 2:
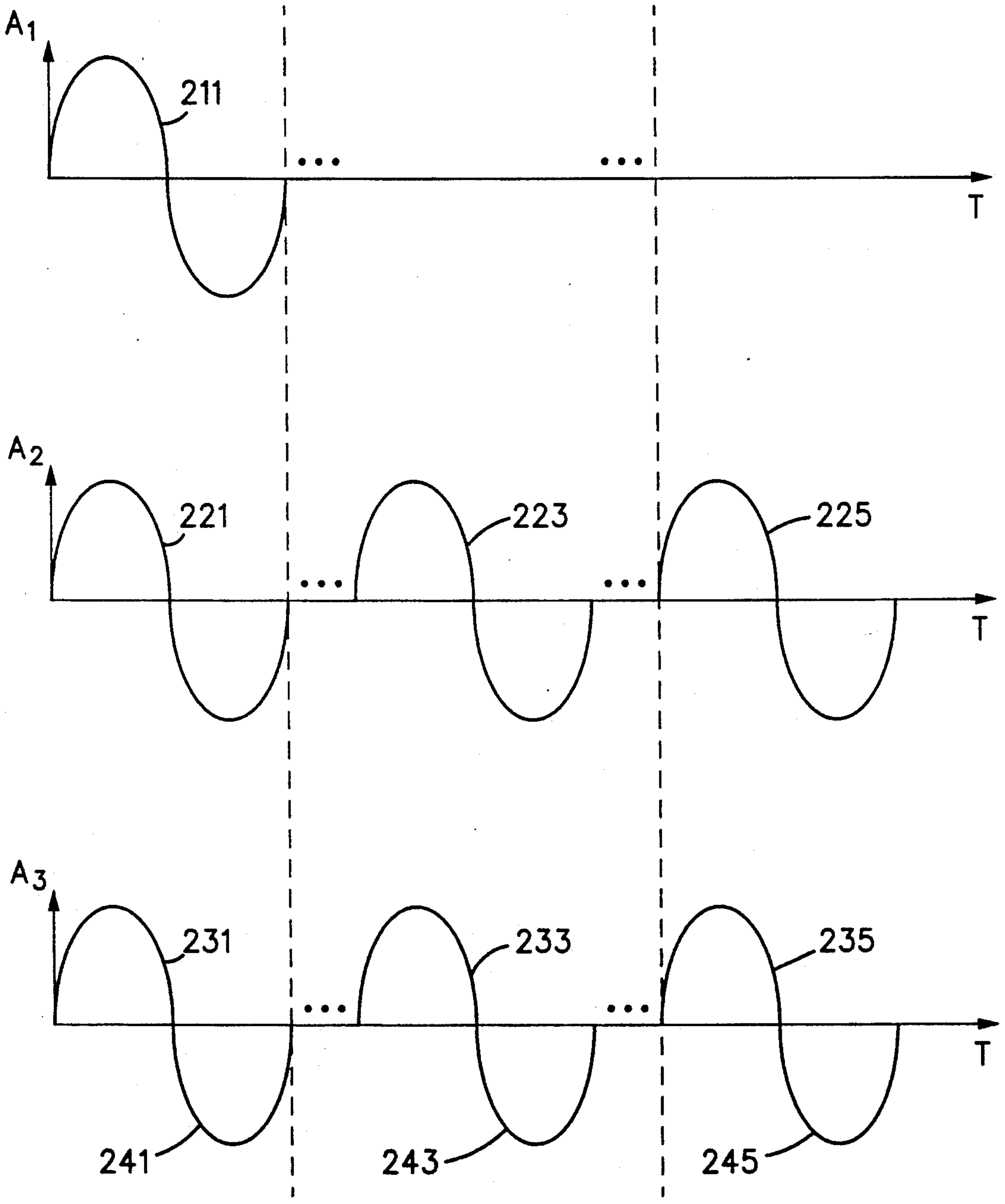
Figure 3:
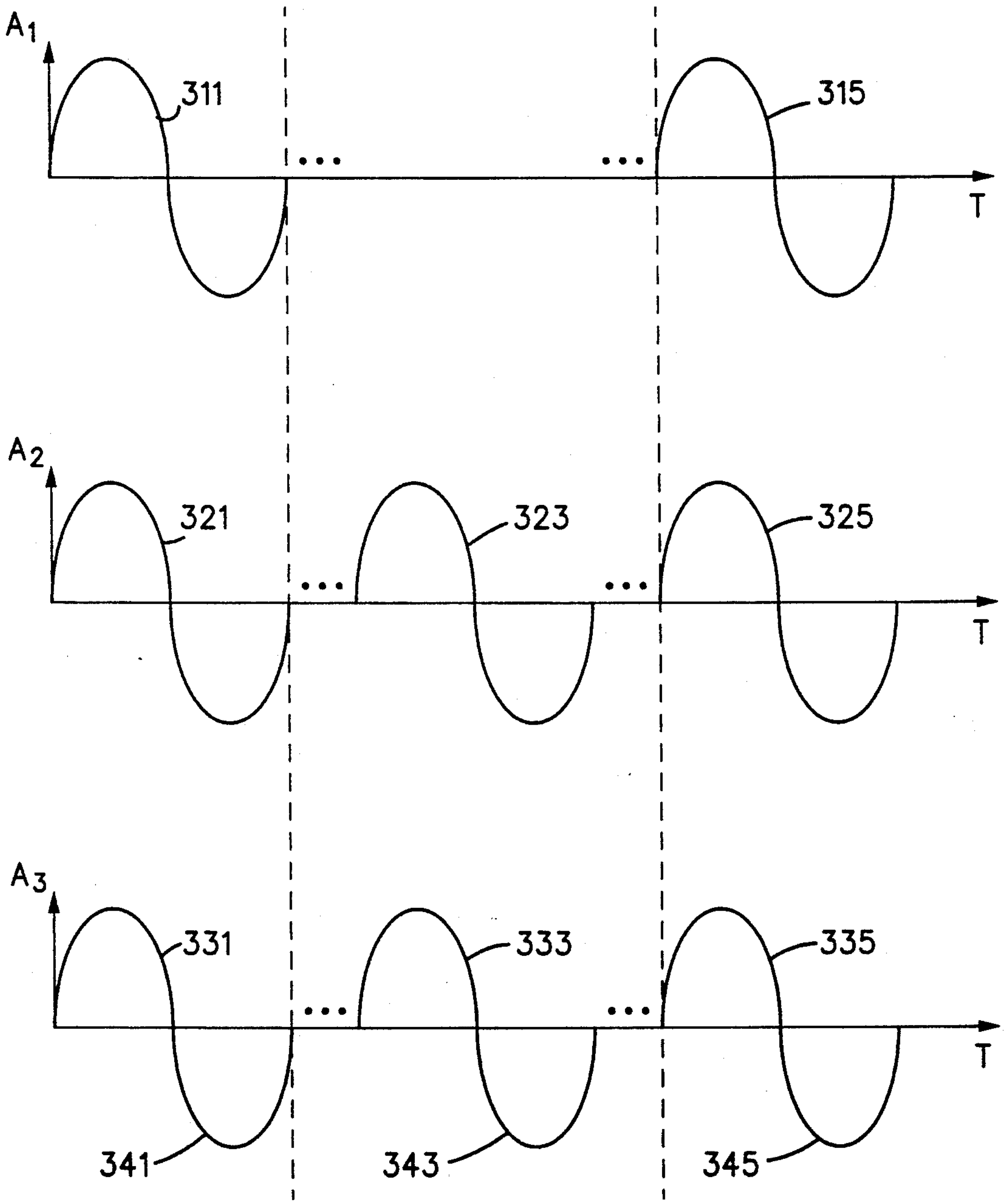
Figure 4:
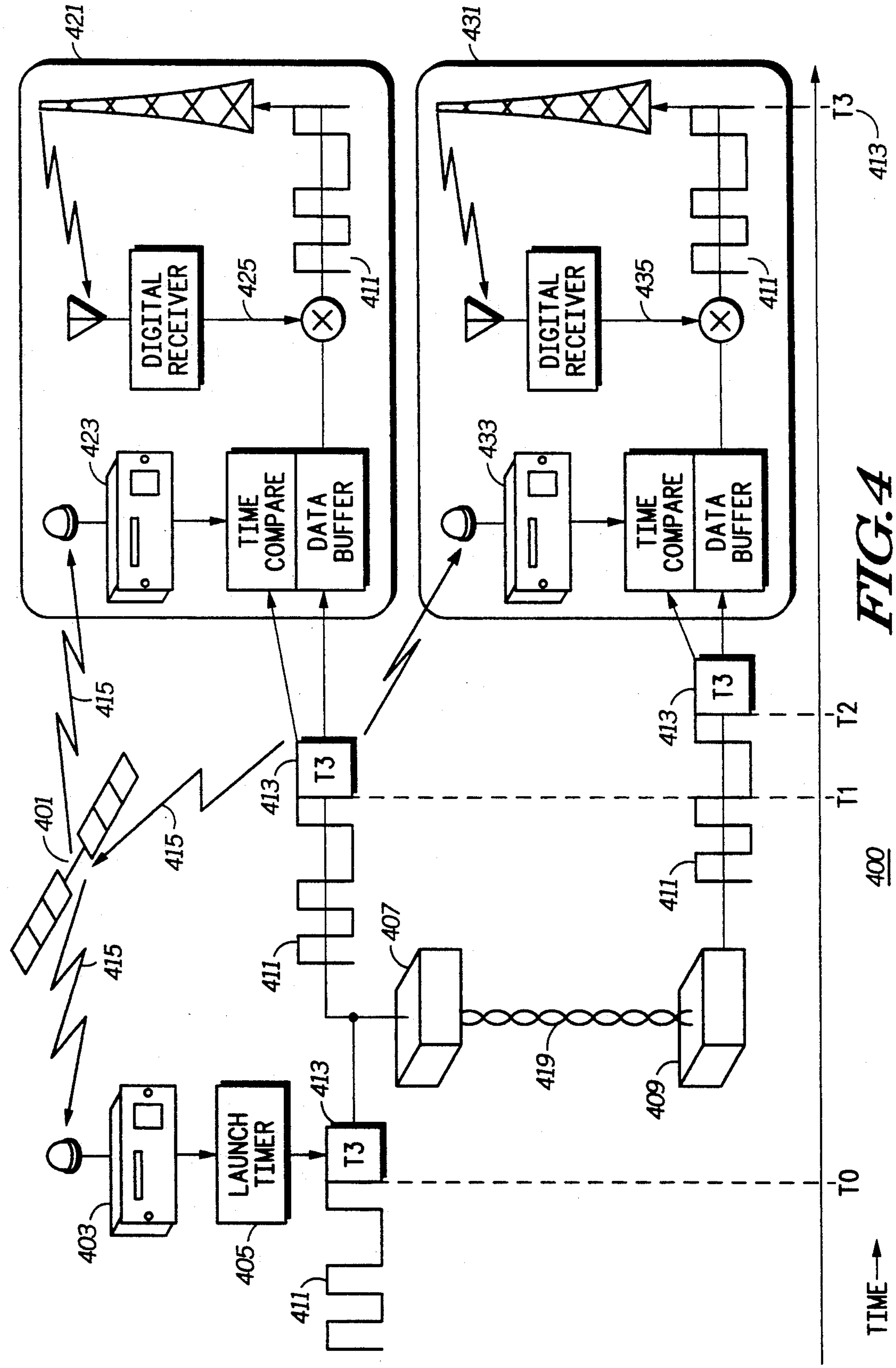
FIG. 4 is a first embodiment of a simulcast system configuration in accordance with the present invention.

Referring now to FIG. 4, there is shown a first embodiment of a simulcast system in accordance with the present invention. A simulcast system consists of a prime site and remote sites enclosing a certain coverage area. The prime site sends the baseband signal to be transmitted to the remote over some backbone channel. The remote sites are synchronized to key up at some prescribed time to produce a standing wave over the coverage area. If they are not synchronized, destructive interference will occur and the coverage area will be minimized.

If the remote sites 421, 431 (or "remotes") communicate to the prime 403 over a backbone channel with variable delay, i.e., a modem link 419, the remotes 421, 431 must be synchronized to each other to produce a centered standing wave. One method of synchronizing the remotes 421, 431 together and to the prime 403 is to have a remote synchronization clock which is derived from a signal 415 received from a GPS satellite 401 (term this rate $f_{pps}$), phase-locked to a faster clock (a transmit sample clock termed $f_{tx}$), both of which run into the remotes. With these clocks, the remotes can count from 0 to $((f_{pps}*f_{tx})-1)$ (term this counter the launch time counter) with each period of the transmit sample clock and reset this counter with each period of the remote synchronization clock.

The prime 403 can communicate to the remotes 421, 431 using a standardized frame over the backbone channel that the baseband signal is sent. If the baseband signal is voice, it can be vocoded using LPC leaving room for embedded signalling or, if the baseband signal is data, the backbone rate must be faster than the data rate. When the prime sends the command to the remotes to begin a simulcast transmission, the prime would then send the time to launch (hereinafter "LAUNCH TIME") as an integer from 0 to ($f_{pps}*f_{tx}-1$). When the remotes receive the baseband signal, it is then buffered up and transmitted when the remote launch time counter equals the LAUNCH TIME.

A running count of backbone data frames (hereinafter "FRAME NUM" and is always $\geqq 1$), including that specific frame, is embedded in each frame, and thus would be present in addition to the original LAUNCH TIME.

To resynchronize, the remote simply needs to extract LAUNCH TIME and FRAME NUM from the embedded signalling. In addition to the LAUNCH TIME and FRAME NUM, the remote needs the knowledge of how long the frame of data sent over the backbone channel as an integer from 0 to ($f_{pps}*f_{tx}-1$) which is actually the number of transmit sample clock periods per frame (TRANSMIT SAMPLE PERIODS/1 FRAME). With this information, the remote can calculate the realignment time to reenter the simulcast broadcast in phase with the other remotes:

$$\text{PHASE REALIGNMENT TIME}=[(\text{FRAME NUM}-1)*(\text{TXMIT SAMPLE PERIODS/1 FRAME})+\text{LAUNCH TIME}] \text{ MOD } (f_{tx}f_{pps}).$$

NOTE: X MOD (Y)=THE REMAINDER OF X/Y.

This phase realignment time is the sample clock period to begin transmitting the first bit of the current digital frame received over the backbone channel.

For example, assume a simulcast system with each frame containing 17,280 transmit sample periods. Assume, at a remote site, that a brown out occurs in mid-afternoon on Dec. 25, 1990 prior to frame number 116 being received. When frame number 116 is received, it indicates a launch time of 32,152 (expressed in transmit sample clock periods). Assume the remote has a transmit clock frequency of 48,000 samples/sec and a remote synchronization clock of 1PPS. The site may then compute the time to begin transmitting the first bit of frame number 116 as follows:

$$[(116-1)*(17{,}280/1 \text{ FRAME})+32{,}152] \text{ MOD } (48{,}000*1)=3{,}352$$

This number is calculated in the remote site. The remote site will then begin transmitting when the transmit sample clock count equals 3,352. The signal transmitted will be guaranteed to be phase aligned with the other simulcasting remotes.

Figure 5:
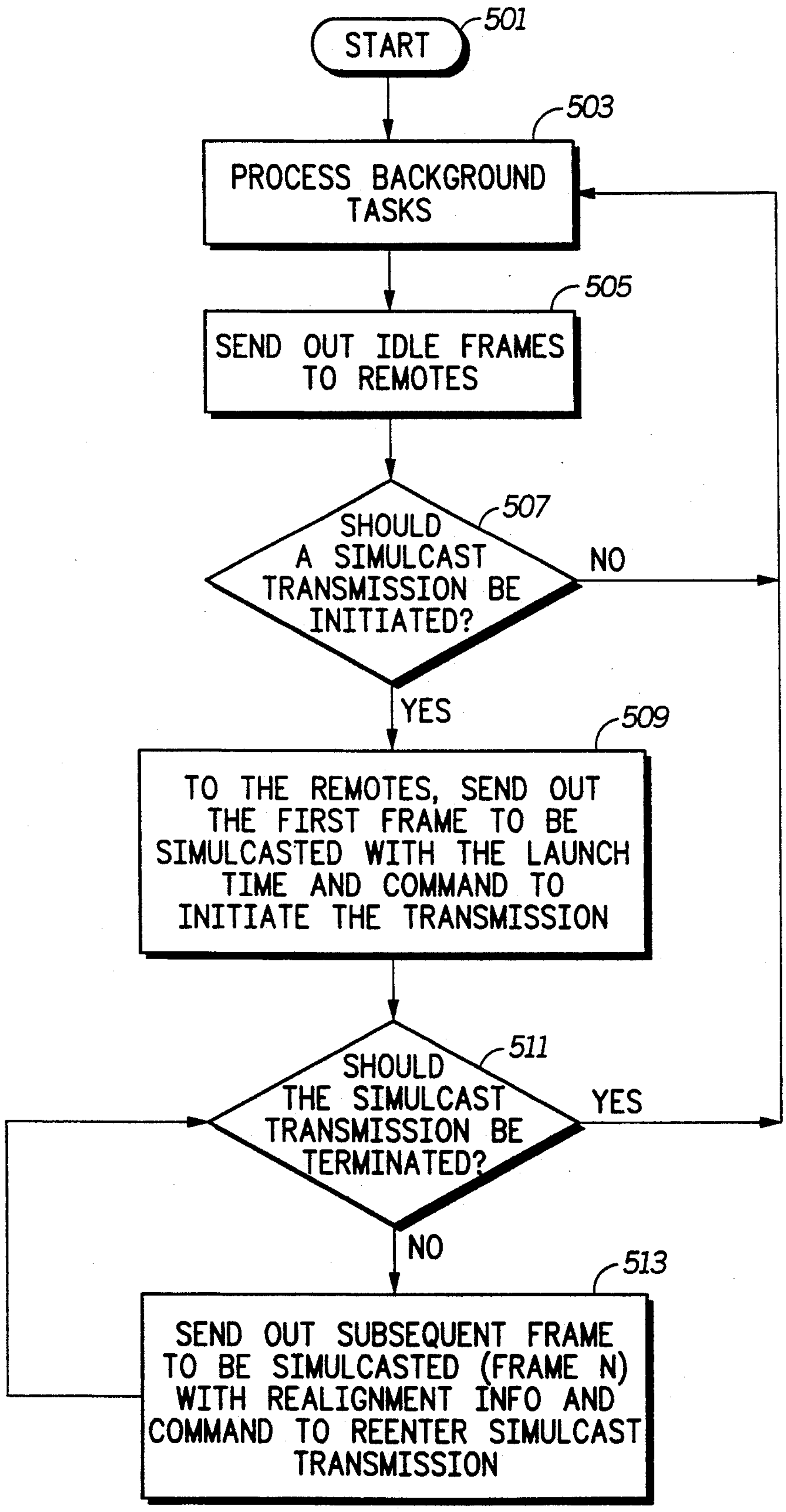
FIG. 5 is a first embodiment of a flow diagram for the prime site, in accordance with the present invention.

FIG. 5 is a first embodiment of a flow diagram for the prime site to provide realignment information which insures phase alignment of every digital frame to be simulcasted, in accordance with the present invention.

The process starts (step 501), and then proceeds to process background tasks, step 503. The process then sends out idle signals to remotes, step 505.

The prime then determines whether it should initiate a simulcast transmission. If the answer is yes, the prime goes to step 509. If the answer is no, the prime continues processing background tasks, step 503.

At step 509, the prime sends a first frame to be simulcasted with the command to initiate simulcast transmission. The prime then determines whether the simulcast call has concluded. If the answer is yes, the prime return to step 503. If the answer is no, the prime sends out frames to be simulcasted after the first frame with realignment info and a command to reenter simulcast, step 513.

The prime then determines whether the simulcast call has concluded, step 511. If the answer is yes, the prime returns to step 503 (process background tasks). If the answer is no, the prime returns to step 513 (send out frames).

Figure 6:
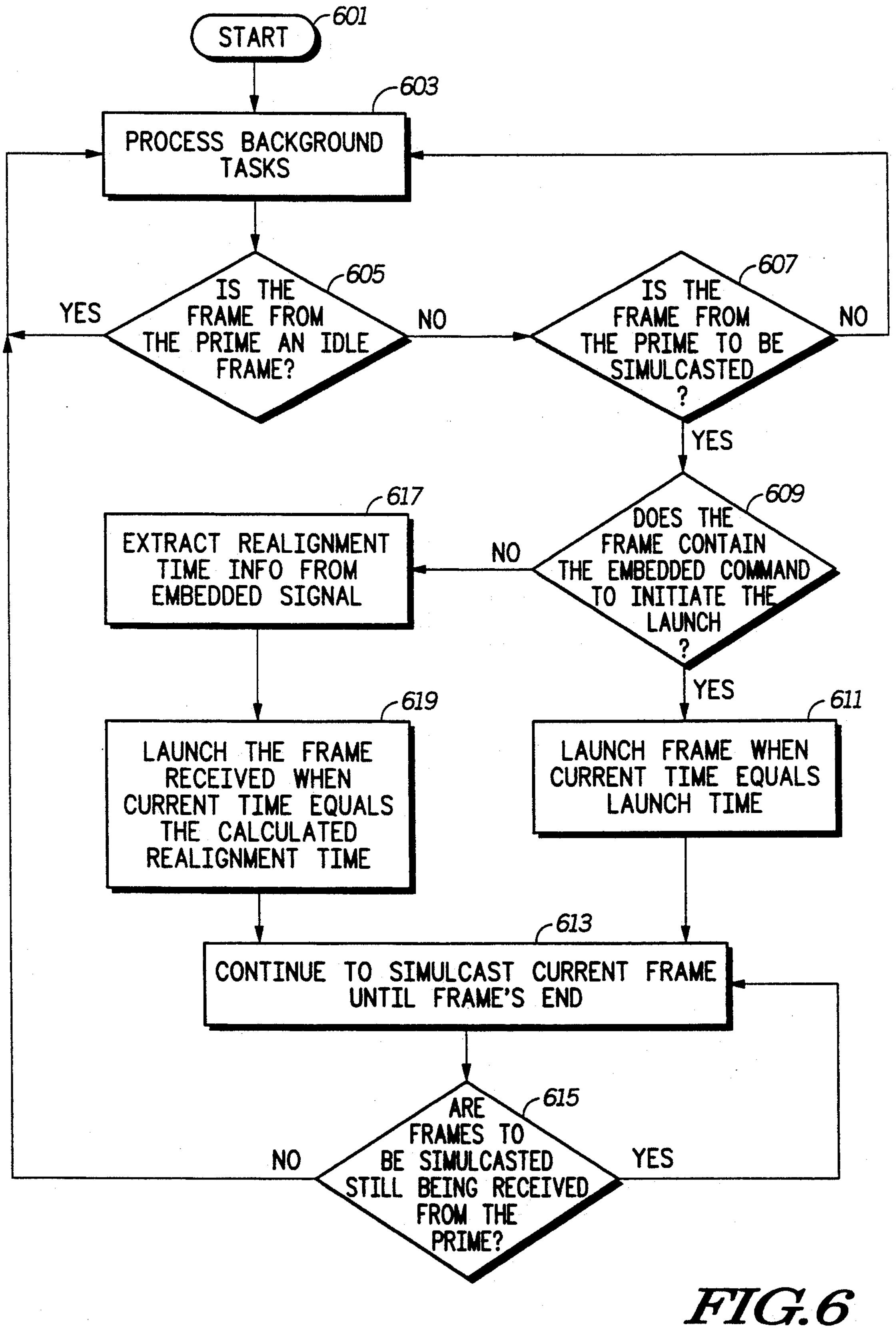
FIG. 6 is a first embodiment of a flow diagram for the remote site, in accordance with the present invention.

FIG. 6 is a first embodiment of a flow diagram for the remote site to phase align every digital frame to be simulcasted.

The process begins (step 601), and then begins processing background tasks (step 603).

The remote continues processing background tasks (step 603), until it determines that the present frame from the prime is NOT an idle signal, step 605. The remote then goes to step 607, where it determines whether the frame is supposed to be simulcasted. If the answer is yes, the process goes to step 609, otherwise (the answer is no), it returns to step 603.

At step 609, the remote determines whether the frame contains the embedded command to initiate a launch. If the answer is yes, the remote goes to step 611. Otherwise, if the answer is no, the remote goes to step 617.

At step 611, the remote launches the frame when it determines that the current time is equal to the launch time. The remote then goes to step 613.

At step 617, the remote extracts realignment time information from the embedded signal. The remote then launches the frame when the current time is equal to the calculated realignment time, step 619. The remote then goes to step 613.

At step 613, the remote continues to simulcast the frame until it reaches the end of frame. The remote then goes to step 615, where it determines whether there exist frames to be simulcasted still being received from the prime site. If the answer is yes, the remote returns to step 613. If the answer is no, the remote returns to step 603 (process background tasks).

As soon as a remote has recovered from a power interruption, telephone line interruption, etc. it can reenter a simulcast transmission. Rather than compromise coverage for the remaining length of the simulcast program (which can be on the order of several minutes), the coverage area can be regained immediately after the remote recovers operationally.

This method will work assuming the LAUNCH TIME is within $1/f_{pps}$ seconds of the first frame received over the backbone channel and as along as the prime gave enough time for the remotes to receive the frame and initialize before transmitting the signals.

Also, the embedded signalling needed for resyncing need not be present in every frame sent over the backbone. A bit could be set or some other flag could be present in the backbone frame when the resyncing data is present in that particular frame. This would determine the granularity of resyncing intervals.

If a base station were to go down, lose sanity in the middle of a transmission, lose sync with the other base stations, or simply wanted to resynchronize its symbols with the other transmitters, it could reenter the simulcast transmission with the other base stations without causing intersymbol interference. It could align its symbols with the other base stations at any point in time. This service can be especially advantageous during a thunderstorm, when, because of lightning in the area, remote site operation may be interrupted every few minutes.

Assuming the delay from a prime site to a remote site is unknown (as is allowed in an absolute time simulcast system), there is no current method of being able to resynchronize a base station if it were to go down in the middle of a simulcast broadcast. The remote would have to stay dekeyed until the next simulcast transmission. The base station could only safely begin a transmission at the beginning of a simulcast broadcast for fear of interfering with the other broadcasting stations. Using the synchronization method and apparatus, according to the invention, as described herein, a remote site could begin transmitting in the middle of a simulcast broadcast. This improves the reliability of maintaining a constant coverage area.

It will be appreciated that the present invention utilizes embedded signalling by including the FRAME NUM and LAUNCH TIME data in the baseband signal over the backbone channel. These two data signals must be received by the remotes with the same delay the baseband signal is received from the prime.

It will be appreciated that a digital signal processor (such as, for example, the DSP56001, available from Motorola, Inc.) simplifies the math and therefore makes the resyncing simple. For instance, the high resolution launch clock would drive an interrupt on a DSP and the DSP would count the number of interrupts. The slower clock would drive a second interrupt on the DSP and zero-out the transmit sample clock counter. Also, if the DSP56001 were employed, modulo addition can be done in 2 clock cycles. Because of these interrupts, and the ease in which a DSP performs math, a DSP can resync the remote site with virtually no overhead upon the processor.

It will be appreciated that a synchronization method and apparatus, according to the invention, can be utilized in any digital simulcast system in which a frame of data from a prime site contains embedded messages to the remote sites. If the system has variable delay and synchronization is essential, then the present invention is relatively simple to implement.

While various embodiments of a synchronization method and apparatus, according to the present invention, have been described hereinabove, the scope of the invention is defined by the following claims.

What is claimed is:

1. In a simulcast system having a base site and a remote site, the base site including a transmit clock of frequency $f_{tx}$ and arranged for transmitting a message comprising a plurality of frames to the remote site, the plurality of frames including a first frame, each frame of the plurality of frames comprising a sequence number (n) and a predetermined number (k) of transmit sample periods, the remote site including a remote synchronization clock of frequency $f_{pps}$, the remote site arranged for receiving the plurality of frames from the base site, the remote site further arranged for scheduling transmission of the plurality of frames at predetermined times, the time said each frame of the plurality of frames is scheduled to be transmitted being defined as a launch time, and wherein the $f_{tx}$ and $f_{pps}$ are predetermined, a method for the remote site to transmit said each frame, the method comprising the following steps:

at the remote site:

(a) receiving one of the plurality of frames from the base site, thus forming a received frame;

(b) determining the sequence number n for the received frame;

(c) determining the launch time ($t_0$) for the first frame;

(d) computing a realignment time ($t_r$) for the received frame based on $((n-1) *(k)+t_0)$ MOD $(f_{tx}f_{pps})$; and, (e) determining when current time $(t)=t_r$ and, when said current time $(t)=t_r$, transmitting the received frame.

2. The method of claim 1 wherein the received frame includes a first signal based on the sequence number n, and the step (b) includes a step of decoding said first signal.

3. The method of claim 2 wherein the received frame includes a second signal based on the launch time for the received frame, and the step (c) includes a step of decoding the second signal.

4. The method of claim 3, the method further including a step of receiving a synchronization signal from a satellite.

5. The method of claim 4 wherein the receiving step (a) is performed using a backbone channel.

6. The method of claim 5 wherein the first signal and the second signal are embedded in the received frame.

7. The method of claim 6 wherein the steps (a) through (e) are performed subsequent to temporarily losing the synchronization signal.

8. The method of claim 6, where the backbone channel includes a variable delay.

9. The method of claim 8, where the backbone channel includes a link comprising one or more modems.

10. The method of claim 2 including a step of receiving a synchronization signal from a satellite.

11. The method of claim 10 wherein the receiving step (a) is performed using a backbone channel.

12. The method of claim 11 wherein the first signal and the second signal are embedded in the received frame.

13. The method of claim 12 wherein the steps (a) through (e) are performed subsequent to temporarily losing the synchronization signal.

14. The method of claim 12, where the backbone channel includes a variable delay.

15. The method of claim 14, where the backbone channel includes a link comprising one or more modems.

16. A remote site suitable for use in a simulcast system, the simulcast system including a base site, the base site including a transmit clock of frequency $f_{tx}$ and arranged for transmitting a message comprising a plurality of frames to the remote site, the plurality of frames including a first frame, each frame of the plurality of frames comprising a sequence number (n) and a predetermined number (k) of transmit sample periods, the remote site including a remote synchronization clock of frequency $f_{pps}$, the remote site arranged for receiving the plurality of frames from the base site, the remote site further arranged for scheduling transmission of the plurality of frames at predetermined times, the time said each frame of the plurality of frames is scheduled to be transmitted being defined as a launch time, wherein the $f_{tx}$ and $f_{pps}$ are predetermined, the remote site further including:

receiving means for receiving one of the plurality of frames from the base site, thus forming a received frame;

sequence determining means for determining the sequence number n for the received frame;

launch time determining means for determining the launch time ($t_o$) for the first frame;

computing means for computing a realignment time ($t_r$) for the received frame based on $((n-1)*(k)+t_o)$ MOD $(f_{tx}f_{pps})$; and, transmitting means for determining when current time $(t)=t_r$ and, when said current time $(t)=t_r$, transmitting the received frame.

17. The remote site of claim 16 wherein the received frame includes a first signal based on the sequence number n, and the sequence determining means includes means for decoding the first signal.

18. The remote site of claim 17 wherein the received frame includes a second signal based on the launch time for the received frame, and the launch time determining means includes means for decoding the second signal.

19. The remote site of claim 18, the transmitting means further including means for receiving a synchronization signal from a satellite.

20. The remote site of claim 19, wherein the receiving means further includes a backbone channel.

21. The remote site of claim 20 wherein the first signal and the second signal are embedded in the received frame.

22. The remote site of claim 21, wherein the backbone channel further includes a variable delay.

23. The remote site of claim 22, where the backbone channel includes a link comprising one or more modems.

24. The remote site of claim 17, the transmitting means further including means for receiving a synchronization signal from a satellite.

25. The remote site of claim 24 wherein the receiving means further includes a backbone channel.

26. The remote site of claim 25 wherein the first signal and the second signal are embedded in the received frame.

27. The remote site of claim 26, where the backbone channel further includes a variable delay.

28. The remote site of claim 27, where the backbone channel includes a link comprising one or more modems.

* * * * *